(12) United States Patent
Byers et al.

(10) Patent No.: US 10,475,542 B2
(45) Date of Patent: Nov. 12, 2019

(54) NUCLEAR FUEL ROD

(71) Applicant: Westinghouse Electric Company LLC, Cranberry Township, PA (US)

(72) Inventors: William A. Byers, Murrysville, PA (US); Guoqiang Wang, Murrysville, PA (US); Kevin A. Harding, Sarver, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 429 days.

(21) Appl. No.: 15/628,695

(22) Filed: Jun. 21, 2017

(65) Prior Publication Data

US 2017/0372802 A1    Dec. 28, 2017

Related U.S. Application Data

(60) Provisional application No. 62/353,223, filed on Jun. 22, 2016.

(51) Int. Cl.
*G21C 3/10* (2006.01)
*G21C 3/07* (2006.01)

(52) U.S. Cl.
CPC ...... *G21C 3/10* (2013.01); *G21C 3/07* (2013.01)

(58) Field of Classification Search
CPC ..... G21C 3/04; G21C 3/06; G21C 3/07; G21C 3/10; G21C 3/105
USPC .......................... 277/510, 534, 539; 220/235
See application file for complete search history.

(56) References Cited

U.S. PATENT DOCUMENTS

| | | | | | |
|---|---|---|---|---|---|
| 3,419,180 | A | * | 12/1968 | Homrig | F16J 13/12 220/235 |
| 4,664,878 | A | * | 5/1987 | Wilson | G21C 3/328 376/328 |
| 4,826,217 | A | * | 5/1989 | Guerrero | F16L 55/179 219/69.17 |
| 4,963,318 | A | * | 10/1990 | Johansson | G21C 3/334 376/446 |
| 5,608,768 | A | * | 3/1997 | Matzner | G21C 3/10 376/451 |
| 5,687,974 | A | * | 11/1997 | Wilkinson | F16J 15/20 277/537 |
| 2006/0039524 | A1 | * | 2/2006 | Feinroth | C04B 35/806 376/409 |
| 2007/0242792 | A1 | | 10/2007 | Blaudin De The | |

(Continued)

FOREIGN PATENT DOCUMENTS

| JP | 2012233734 A | 11/2012 |
|---|---|---|
| KR | 20100114287 A | 10/2010 |
| WO | 2015/175035 A2 | 11/2015 |

(Continued)

OTHER PUBLICATIONS

International Search Report and Written Opinion, PCT/US2017/038484, dated May 4, 2018, 9 Pages.

*Primary Examiner* — Sharon M Davis
(74) *Attorney, Agent, or Firm* — Joseph C. Spadacene; Westinghouse Electric Company LLC (57) ABSTRACT

A Gland Seal End Plug closure for a nuclear fuel rod cladding composed of silicon carbide or other materials that cannot be welded. The sealant is, preferably, made from one or more forms of pure graphite and the ram, seat and other components of the Gland Seal End Plug are formed from high temperature metallic or ceramic materials.

12 Claims, 7 Drawing Sheets

(56) References Cited

U.S. PATENT DOCUMENTS

2012/0171430 A1* 7/2012 Riedell .................. B32B 18/00
                                                    428/189
2016/0049211 A1* 2/2016 Feinroth ................. G21C 3/07
                                                    376/416

FOREIGN PATENT DOCUMENTS

| WO | WO-2015175034 A2 * | 11/2015 | ........... B23K 1/0008 |
| WO | 2016/084146 A1 | 6/2016 | |

* cited by examiner

NUCLEAR FUEL ROD

CROSS REFERENCE TO RELATED APPLICATION

This application claims priority to U.S. Provisional Patent Application Ser. No. 62/353,223, filed Jun. 22, 2016 entitled NUCLEAR FUEL ROD.

BACKGROUND

1. Field

This invention relates in general to nuclear fuel rods and, more particularly, to nuclear fuel rods that have a cladding constructed from a material that cannot be welded or brazed to an end plug.

2. Related Art

The primary side of nuclear reactor power generating systems which are cooled with water under pressure comprises a closed circuit which is isolated and in heat exchange relationship with a secondary side for the production of useful energy. The primary side comprises the reactor vessel enclosing a core internal structure that supports a plurality of fuel assemblies containing fissile material, the primary circuit within heat exchange steam generators, the inner volume of a pressurizer, pumps and pipes for circulating pressurized water; the pipes connecting each of the steam generators and pumps to the reactor vessel independently. Each of the parts of the primary side comprising a steam generator, a pump and a system of pipes which are connected to the vessel to form a loop of the primary side.

Figure 1:
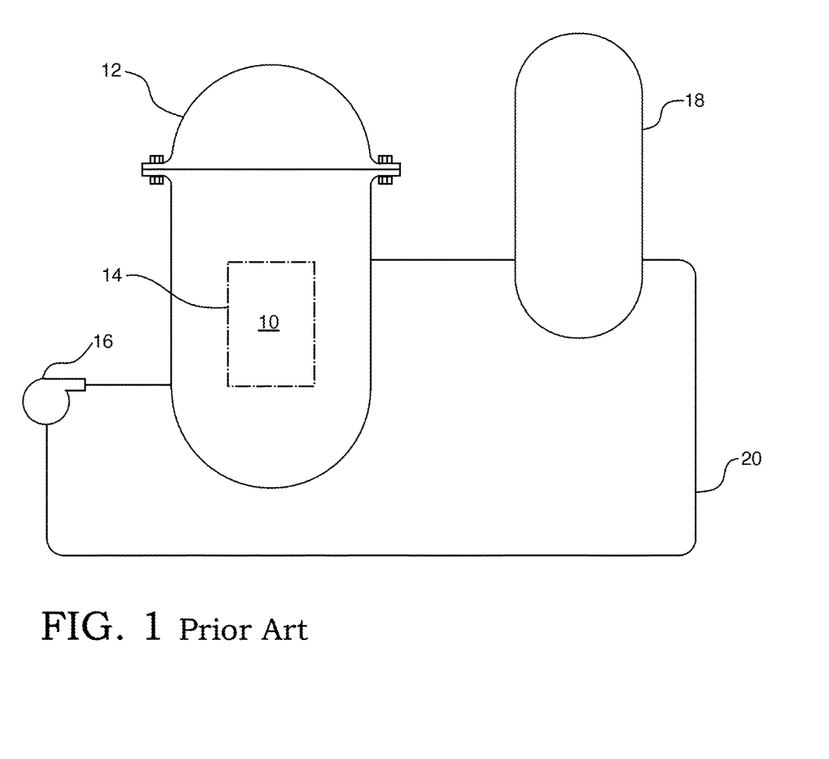
FIG. 1 is a simplified schematic of a nuclear reactor system to which this invention can be applied.

For the purpose of illustration, FIG. 1 shows a simplified nuclear reactor primary system, including a generally cylindrical reactor pressure vessel 10 having a closure head 12 enclosing a nuclear core 14. A liquid reactor coolant, such as water is pumped into the vessel 10 by pump 16 through the core 14 where heat energy is absorbed and is discharged to a heat exchanger 18, typically referred to as a steam generator in which heat is transferred to a utilization circuit (not shown), such as a steam driven turbine generator. The reactor coolant is then returned to the pump 16, completing the primary loop. Typically, a plurality of the above described loops are connected to a single reactor vessel 10 by reactor coolant piping 20.

Figure 2:
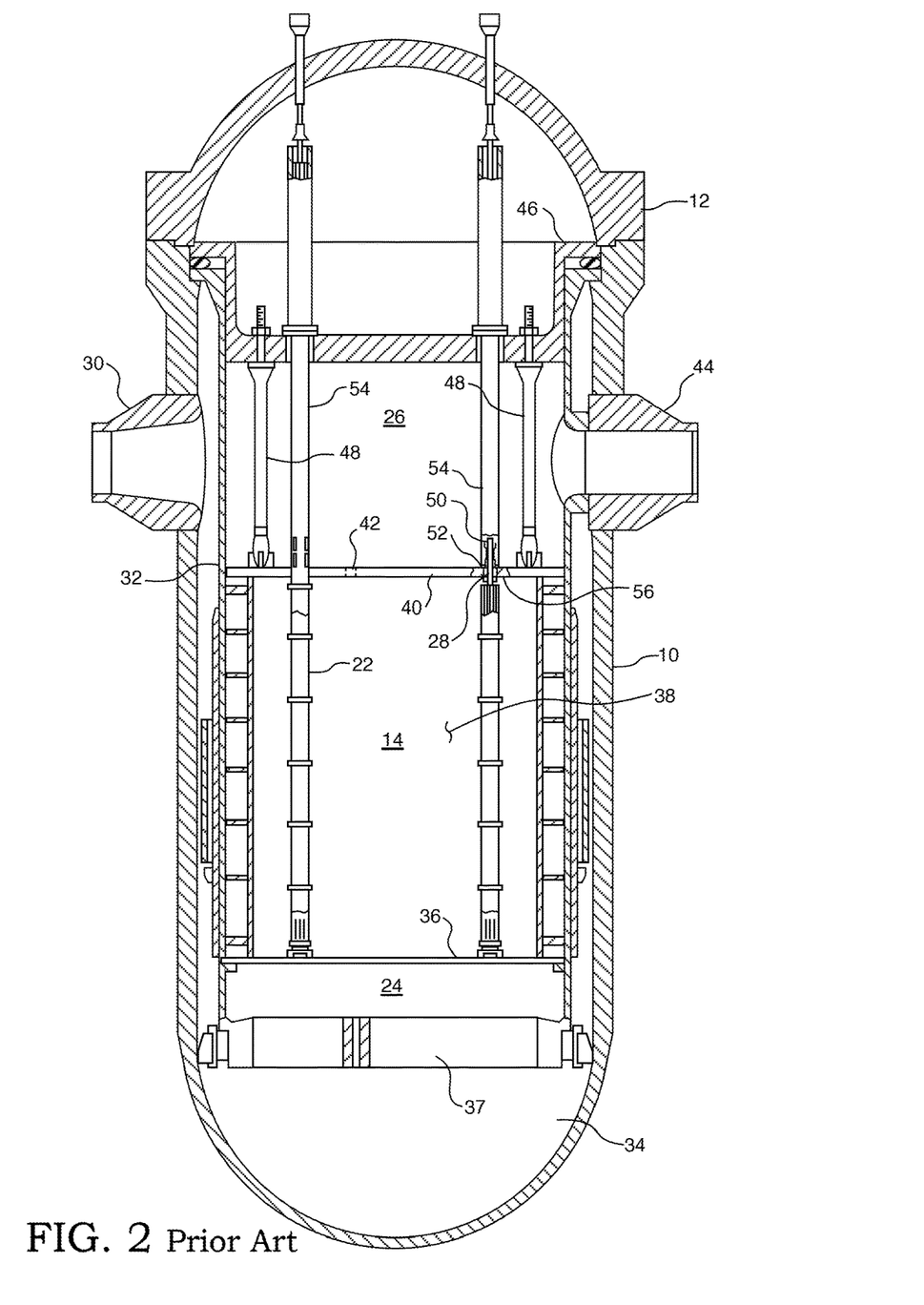
FIG. 2 is an elevational view, partially is section, of a nuclear reactor vessel and internal components to which this invention can be applied.

An exemplary reactor design is shown in more detail in FIG. 2. In addition to the core 14 comprised of a plurality of parallel, vertical, co-extending fuel assemblies 22, for purposes of this description, the other vessel internal structures can be divided into the lower internals 24 and the upper internals 26. In conventional designs, the lower internals' function is to support, align and guide core components and instrumentation as well as direct flow within the vessel. The upper internals restrain or provide a secondary restraint for the fuel assemblies 22 (only two of which are shown for simplicity in this figure), and support and guide instrumentation and components, such as control rods 28. In the exemplary reactor shown in FIG. 2, coolant enters the reactor vessel 10 through one or more inlet nozzles 30, flows down through an annulus between the vessel and the core barrel 32, is turned 180 degrees in a lower plenum 34, passes upwardly through a lower support plate 37 and a lower core plate 36 upon which the fuel assemblies 22 are seated and through and about the assemblies. In some designs, the lower support plate 37 and the lower core plate 36 are replaced by a single structure, the lower core support plate, at the same elevation as 37. The coolant flow through the core and surrounding area 38 is typically large on the order of 400,000 gallons per minute at a velocity of approximately 20 feet per second. The resulting pressure drop and frictional forces tend to cause the fuel assemblies to rise, which movement is restrained by the upper internals, including a circular upper core plate 40. Coolant exiting the core 14 flows along the underside of the upper core plate 40 and upwardly through a plurality of perforations 42. The coolant then flows upwardly and radially to one or more outlet nozzles 44.

The upper internals 26 can be supported from the vessel or the vessel head and include an upper support assembly 46. Loads are transmitted between the upper support assembly 46 and the upper core plate 40, primarily by a plurality of support columns 48. A support column is aligned above a selected fuel assembly 22 and perforations 42 in the upper core plate 40.

The rectilinearly moveable control rods 28 typically include a drive shaft 50 and a spider assembly 52 of neutron poison rods that are guided through the upper internals 26 and into aligned fuel assemblies 22 by control rod guide tubes 54. The guide tubes are fixedly joined to the upper support assembly 46 and connected by a split pin 56 force fit into the top of the upper core plate 40. The pin configuration provides for ease of guide tube assembly and replacement if ever necessary and assures that the core loads, particularly under seismic or other high loading accident conditions, are taken primarily by the support columns 48 and not the guide tubes 54. This support column arrangement assists in retarding guide tube deformation under accident conditions which could detrimentally affect control rod insertion capability.

Figure 3:
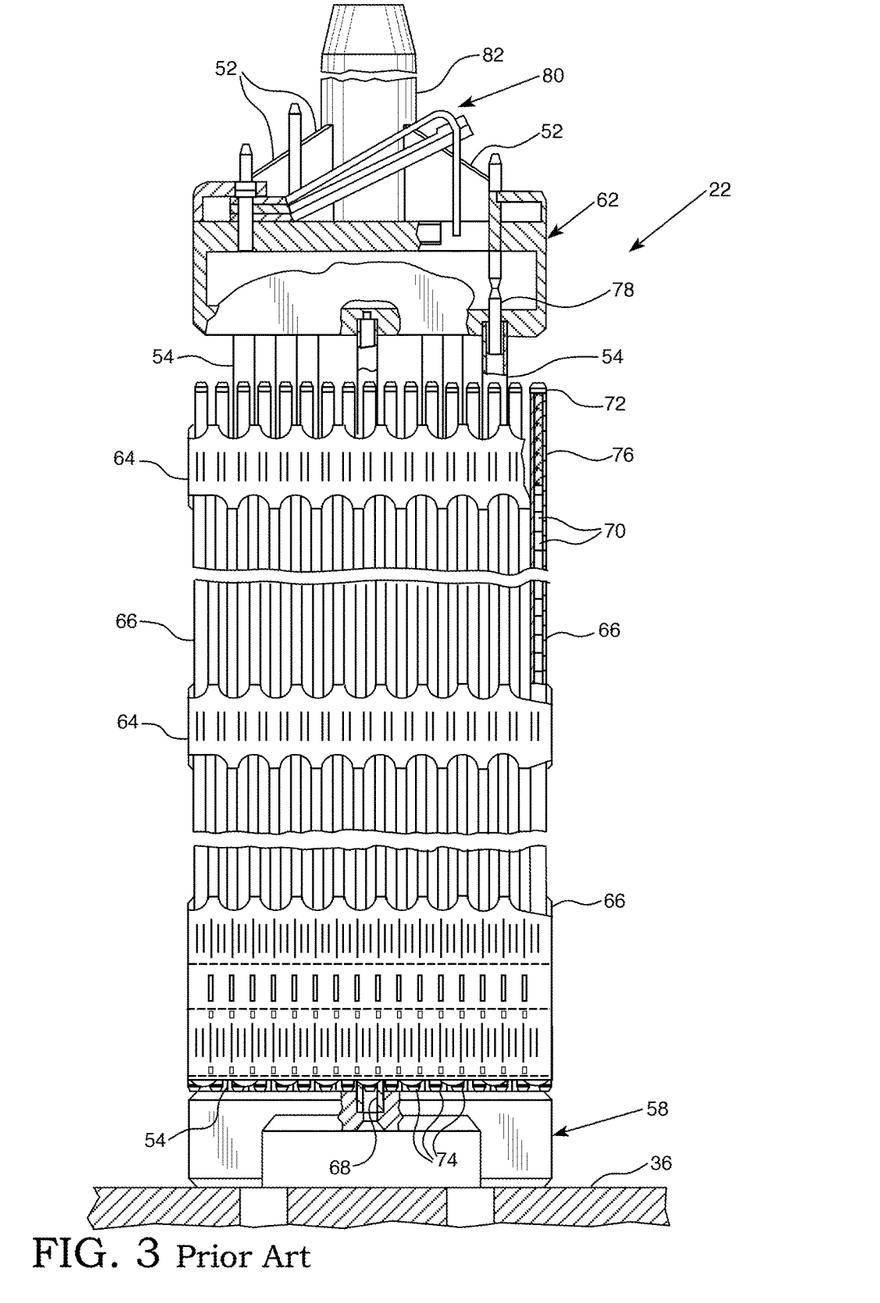
FIG. 3 is an elevational view, partially in section, of a fuel assembly illustrated in vertically shortened form, parts broken away for clarity.

FIG. 3 is an elevational view, represented in vertically shortened form, of a fuel assembly being generally designated by reference character 22. The fuel assembly 22 is the type used in a pressurized water reactor and has a structural skeleton which, at its lower end, includes a bottom nozzle 58. The bottom nozzle 58 supports the fuel assembly 22 on a lower core support plate 60 in the core region of the nuclear reactor (the lower core support plate 60 is represented by reference character 36 in FIG. 2). In addition to the bottom nozzle 58, the structural skeleton of the fuel assembly 22 also includes a top nozzle 62 at its upper end and a number of guide tubes or thimbles 54, which extend longitudinally between the bottom and top nozzles 58 and 62 and at opposite ends are rigidly attached thereto.

The fuel assembly 22 further includes a plurality of transverse grids 64 axially spaced along and mounted to the guide thimbles 54 (also referred to as guide tubes) and an organized array of elongated fuel rods 66 transversely spaced and supported by the grids 64. Although it cannot be seen in FIG. 3, the grids 64 are conventionally formed from orthogonal straps that are interleafed in an egg-crate pattern with the adjacent interface of four straps defining approximately square support cells through which the fuel rods 66 are supported in transversely spaced relationship with each other. In many conventional designs springs and dimples are stamped into the opposing walls of the straps that form the support cells. The springs and dimples extend radially into the support cells and capture the fuel rods therebetween, exerting pressure on the fuel rod cladding to hold the rods in position. Also, the fuel assembly 22 has an instrument tube 68 located in the center thereof that extends between and is mounted to the bottom and top nozzles 58 and 62. With such an arrangement of parts, fuel assembly 22 forms an integral unit capable of being conveniently handled without damaging the assembly of parts.

As mentioned above, the traditional fuel rods 66 in the array thereof in the fuel assembly 22 are held in spaced relationship with one another by the grids 64 spaced along the fuel assembly length. Each fuel rod 66 includes a plurality of nuclear fuel pellets 70 and is closed at its opposite ends by upper and lower end plugs 72 and 74. The pellets 70 are maintained in a stack by a plenum spring 76 disposed between the upper end plug 72 and the top of the pellet stack. The fuel pellets 70, composed of fissile material, are responsible for creating the reactive power of the reactor. The cladding which surrounds the pellets functions as a barrier to prevent the fission by-products from entering the coolant and further contaminating the reactor system.

The power output of a reactor is limited by the highest temperatures the materials within the core can tolerate without compromising their integrity. In the case of pressurized water reactors the fuel rod cladding, which is typically constructed from a Zirconium alloy, is the limiting material. Zirconium is generally chosen for the fuel rod cladding for its excellent neutronic properties. Alternatively, silicon carbide (SiC) has excellent neutronic and high temperature properties making it a possible candidate for accident tolerant fuel (ATF). However, sealing silicon carbide fuel tubes has been a difficult problem and no entirely satisfactory solution has been found. SiC cannot be welded, and seals that involve metal bonding have had only limited success. Silicon carbide has a low coefficient of expansion, and an elongation before break value of less than 1%. Thermal cycling puts high stresses on the bond, causing failures. Deposition of SiC bonding material has been used to avoid thermal mismatch problems and achieve good hermeticity, but this approach to bonding is expensive and has not been successful in reactor testing at MIT. Accordingly, a new end plug seal is desired for SiC fuel rods that will overcome these difficulties.

SUMMARY

This invention overcomes the foregoing shortcomings by providing a nuclear fuel rod comprising a tubular cladding constructed from a material that cannot be welded or brazed, that surrounds an interior volume. A first closure seals off one end of the tubular cladding, with a nuclear fuel occupying a portion of the interior volume, and a gland seal end plug seals off a second end of the tubular cladding.

In one embodiment the gland seal end plug comprises a flexible material that is supported between a wall of the tubular cladding and a force generator that is configured to exert a radially outward force on the flexible material to pressure the flexible material against a wall of an interior of the tubular cladding and seal off the second end of the tubular cladding. In the latter embodiment, the force generator may comprise a ram that extends into an interior of the tubular cladding from an end stopper that closes off the second end of the tubular cladding. The ram is configured to support and exert the radially outward force on the flexible material. Preferably, the ram expands the flexible material against the wall of the interior of the tubular cladding and a seat on an interior of the end stopper. In the latter embodiment the ram may also include a stem that extends through the end stopper from an interior of the tubular cladding to an exterior thereof, with an exterior of the stem being threaded. The stem includes a nut, coupled to the exterior thread that is configured to draw the stem through the end stopper to pressure the flexible material against the wall of the interior of the tubular cladding. In the latter embodiment the flexible material is pressured between an interior end of the ram, the stem, the interior wall of the tubular cladding and the seat. Preferably, a spring washer is included that is structured to be compressed long with the flexible material and maintains a force on the flexible material even if there is thermal expansion of the stem or relaxation of the flexible material. Desirably, the spring washer comprises an alloy such as X-750 or 718. Alternately, the spring washer may comprise a high temperature ceramic such as silicon carbide or a partially stabilized Zirconium Oxide. In the case where the spring washer comprises a ceramic material, the spring washer may include a stack of ceramic spring washers. Preferably, the end stopper is configured to prevent the flexible material from expanding through an interface between the interior of the tubular cladding and the end stopper.

In one such embodiment, the tubular cladding is silicon carbide and the flexible material comprises graphite. Desirably, the flexible material comprises pure graphite, preferably in the form of a mixture of graphite fibers and expanded graphite. Preferably, the end stopper and/or the ram comprises Zircaloy 4. In such an embodiment one or more of the seat, ram and nut comprise silicon carbide and, preferably, the end stopper is coated with silicon carbide.

In still another embodiment the seat is constructed in two layers including a gasket between the two layers of the seat that form a seal between the seat and the stem and the seat and the wall of the hollow tubular member. Preferably, the gasket comprises a plurality of O-ring gaskets. The O-ring gaskets may take the shape of a traditional simple circular design or may be shaped as C-rings, U-rings, V-rings or W-rings or the like.

Thus, this invention provides a Gland Seal End Plug closure for a fuel rod cladding composed of silicon carbide or other materials that cannot be welded. The sealant is, preferably, made from one or more forms of pure graphite and the ram, seat and other components are formed from high temperature metallic or ceramic materials.

BRIEF DESCRIPTION OF THE DRAWINGS

A further understanding of the invention can be gained from the following description of the preferred embodiments when read in conjunction with the accompanying drawings in which.

DESCRIPTION OF THE PREFERRED EMBODIMENT

This invention overcomes the foregoing difficulties by providing a Gland Seal End Plug for Accident Tolerant Fuel (ATF) that uses a soft graphite packing material to achieve a hermetic seal for SiC cladding that can function at pressures expected in a PWR or BWR, even in accident situations. The design is capable of maintaining a seal under high rod internal pressures and high reactor coolant system pressures.

Figure 4:
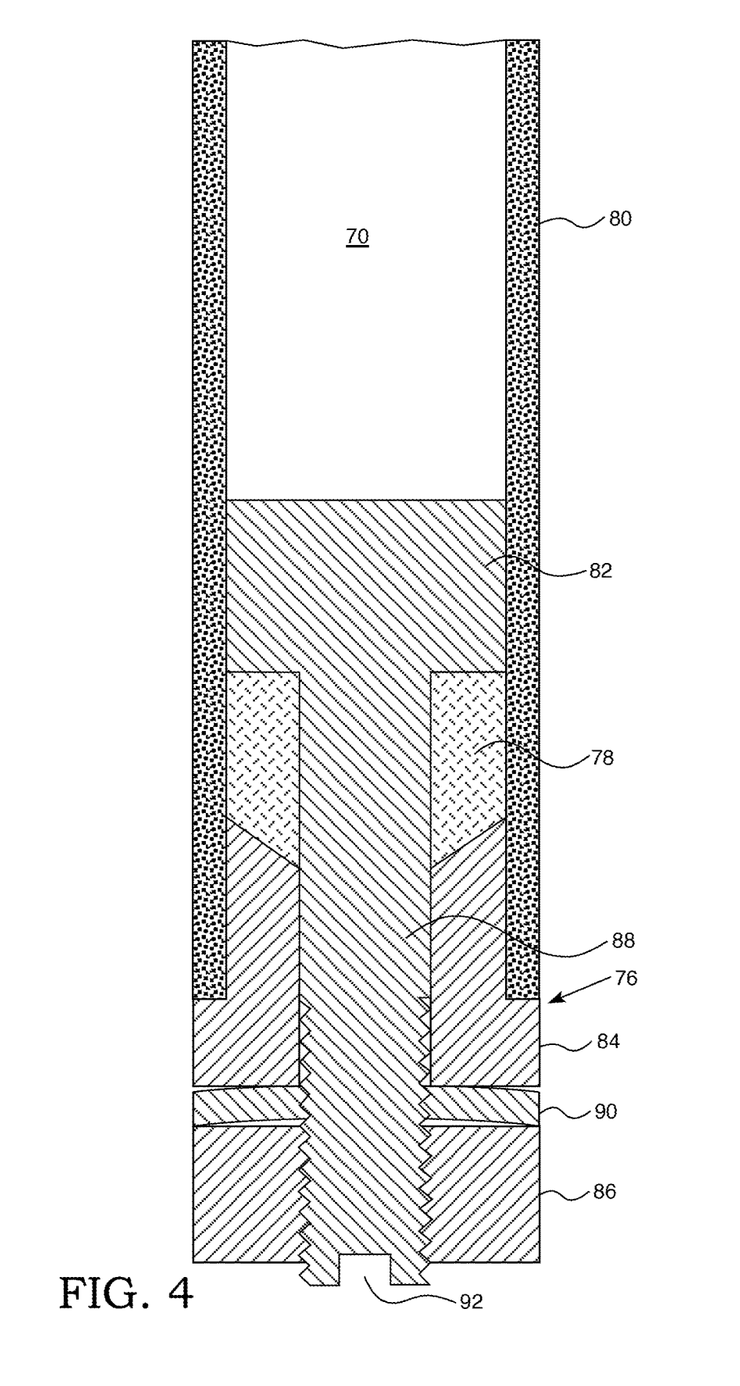
FIG. 4 is a schematic representation of a cross section of one embodiment of this invention.

A conceptual drawing of the Gland Seal End Plug for ATF is shown in FIG. 4. The plug (76) is composed of five basic components. The sealant (78) is a flexible material that expands against the inside diameter of the silicon carbide tube (80) as it is compressed between the gland seal ram (82) and the gland seal seat (84). The sealant (78) engages with the rough surface of the silicon carbide tube (80) inside diameter, such that once the sealant (78) is fully expanded, the plug (76) cannot be pulled from the tube (80) or forced further into the tube. A nut (86) that is threaded onto the gland seal ram stem or shaft (88) is used to draw the gland seal ram (82) toward the gland seal seat (84) to compress the sealant (78). A spring washer (90) is compressed along with the sealant (78), and maintains the force on the sealant even if there is thermal expansion of the gland seal ram (82), or a long term relaxation of the sealant (78). The Allen Socket (92) allows the nut (86) to be tightened without spinning the ram (82).

The plug (76) is designed with dimensions such that it can be pushed into the silicon carbide tube (80) with little or no force before it is expanded. The outside diameter of the plug (76) is sized such that neither the ram (82) nor the seat (84) will apply force to the inside diameter of the silicon carbide tube due to radiation induced swelling and/or thermal expansion.

The preferred material for the sealant (78) is pure graphite. Graphite packing has been used for high temperature valves and is known to be able to withstand temperatures up to 3000° F. (1649° C.). The ideal packing would be a mix of graphite fiber and expanded graphite. The fiber holds the expanded graphite flakes in place and prevents the sealant from being extruded through gaps such as between the tube wall inside diameter and the ram. Expanded graphite sealants maintain their resilience for long periods and at high temperatures, so the spring washer does not need to exert force over a large distance.

A variety of different materials could be used for the other plug components. Zirconium alloys, such as Zircaloy 4, would make a suitable ram, seal seat, and nut material due to proven performance in water cooled reactors, low coefficient of thermal expansion, and high melting point. Zircaloy 4 can be easily welded which would allow several other features to be added to the plug. A hole could be located in the ram for filling the rod with helium and for pressure testing, and afterwards the hole could be welded closed. A tack weld between the nut and the ram could be used to assure that the nut did not loosen during operation.

Another favorable material for the seat, ram, and nut would be silicon carbide. This would give the plug the same thermal expansion as the cladding and the same high temperature performance. Being the same material as the cladding would allow bonding schemes that would otherwise not be possible. For instance, the plug region could be coated with a thin layer of Chemical Vapor Deposition (CVD) silicon carbide which would serve to provide an additional gas barrier, but the layer would not have to have mechanical strength.

The spring washer could be a high temperature metal such as Alloy X-750 or Alloy 718. These materials are known to be corrosion resistant and resistant to stress relaxation during normal operation. The fuel end plugs would not heat up to the same extent as more central core locations during an accident, so these alloys would likely not limit ATF performance. However, if it is determined that for a particular fuel design and core that the spring washer would limit performance, they could also be manufactured from a tough, high temperature ceramic such as silicon carbide or a partially stabilized Zirconium Oxide. If a ceramic material is used for the spring washer, a stack of ceramic spring washers would be required to compensate for growth of the ram and sealant relaxation.

Figure 5:
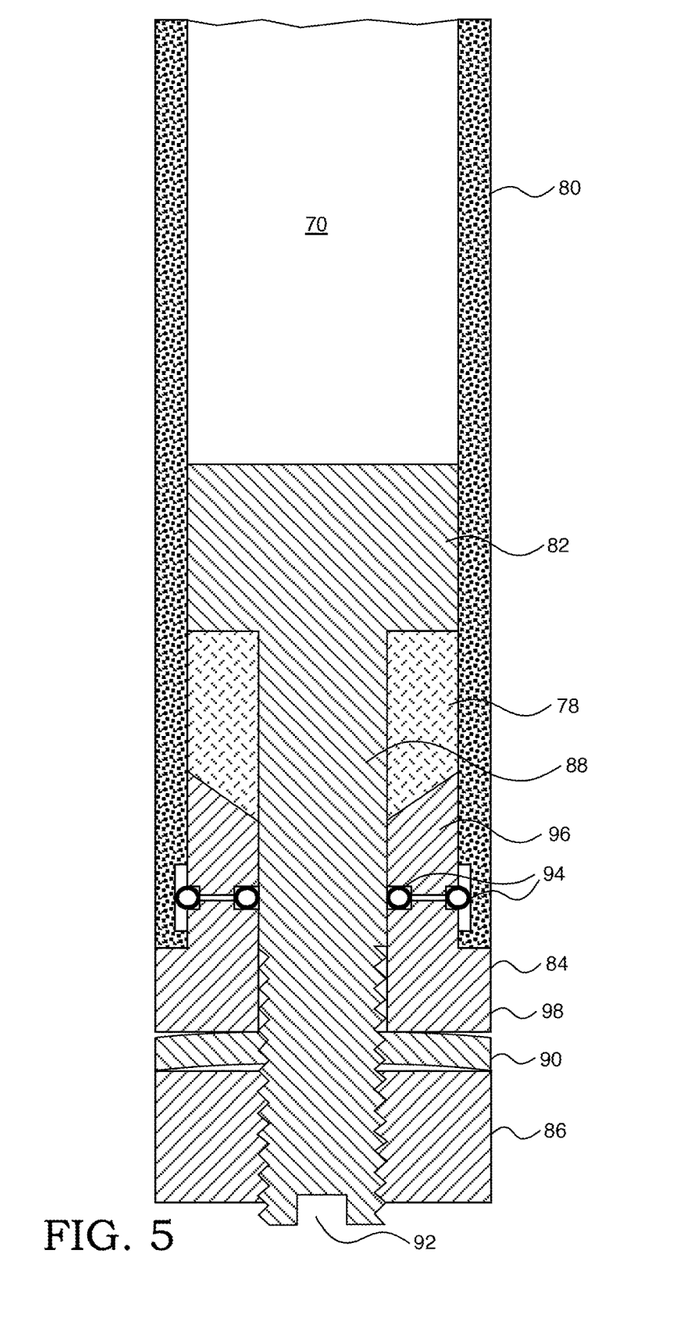
FIG. 5 is a schematic representation of a cross section of a second embodiment of this invention.

A second embodiment of the invention is shown in FIG. 5. A set of high temperature O-rings (94) has been added to provide a back-up sealing capability. The inside of the tube has been machined to produce a smooth surface for sealing. The top of the seat (84) is now constructed of two segments (96, 98), with one of the two segments (96) containing O-ring grooves. The grooves are constructed such that the O-ring expands to contact both the ram stem (88) and the cladding (80) when the Gland Seal End Plug assembly (76) is fully compressed with the nut (86). Besides providing a sealing function themselves, the O-rings (94) also transmit pressure to the graphite sealant (78), assisting the spring washer (90) in compensating for ram (82) growth or sealant (78) compression during operation.

In a preferred embodiment of the secondary O-ring seal, the O-rings (94) are composed of a high-temperature alloy such as X-750 or 718, coated with a soft metallic coating such as platinum or nickel. The invention does not limit the shape of the sealing ring to a simple circular design, but it also includes C-ring, U-rings, V-rings and W-ring, as well as designs that have a more nearly square cross section.

Figure 6:
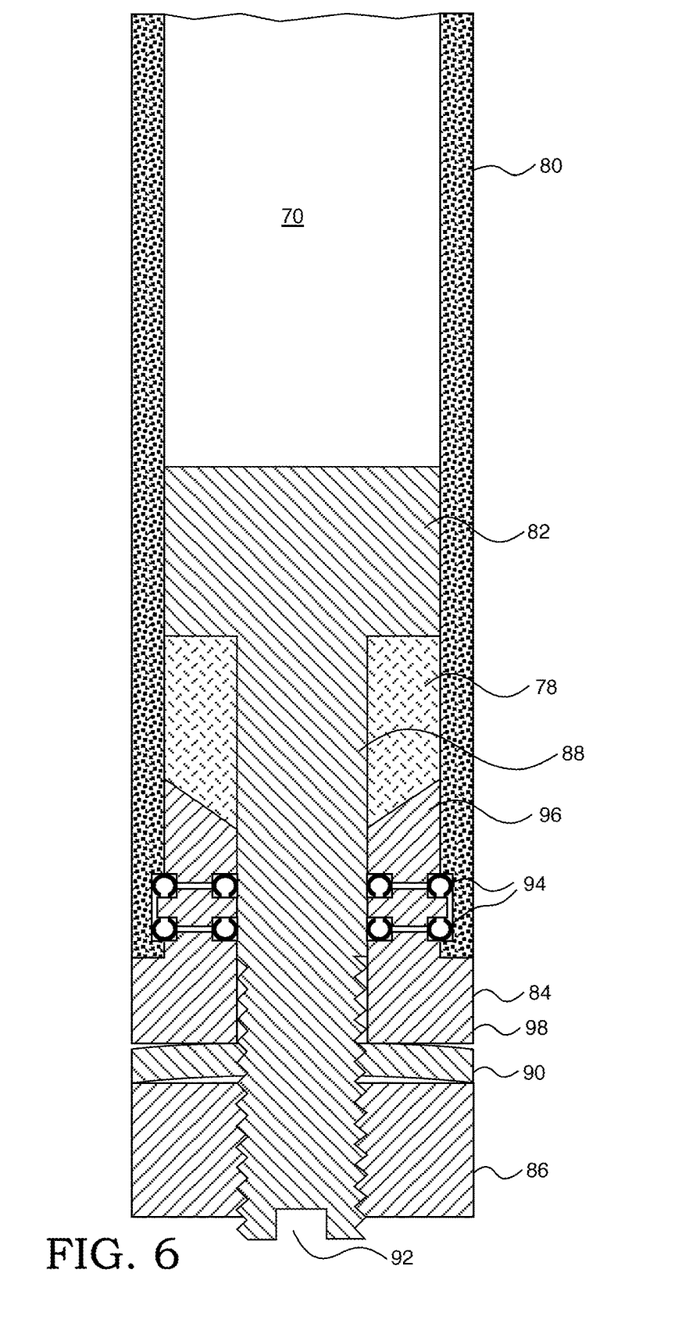
FIG. 6 is a schematic representation of a cross section of a third embodiment of this invention.

Multiple sealing ring segments may be stacked to afford additional reliability. This is shown in FIG. 6. This embodiment, where two sets of C-rings (94) are stacked with the C-ring facing in opposite directions, is particularly favorable due to the fact that the sealing force will increase with pressure, and sealing is equally effective for excluding coolant from the interior of the fuel rod and preventing gasses within the fuel rod from escaping.

Figure 7:
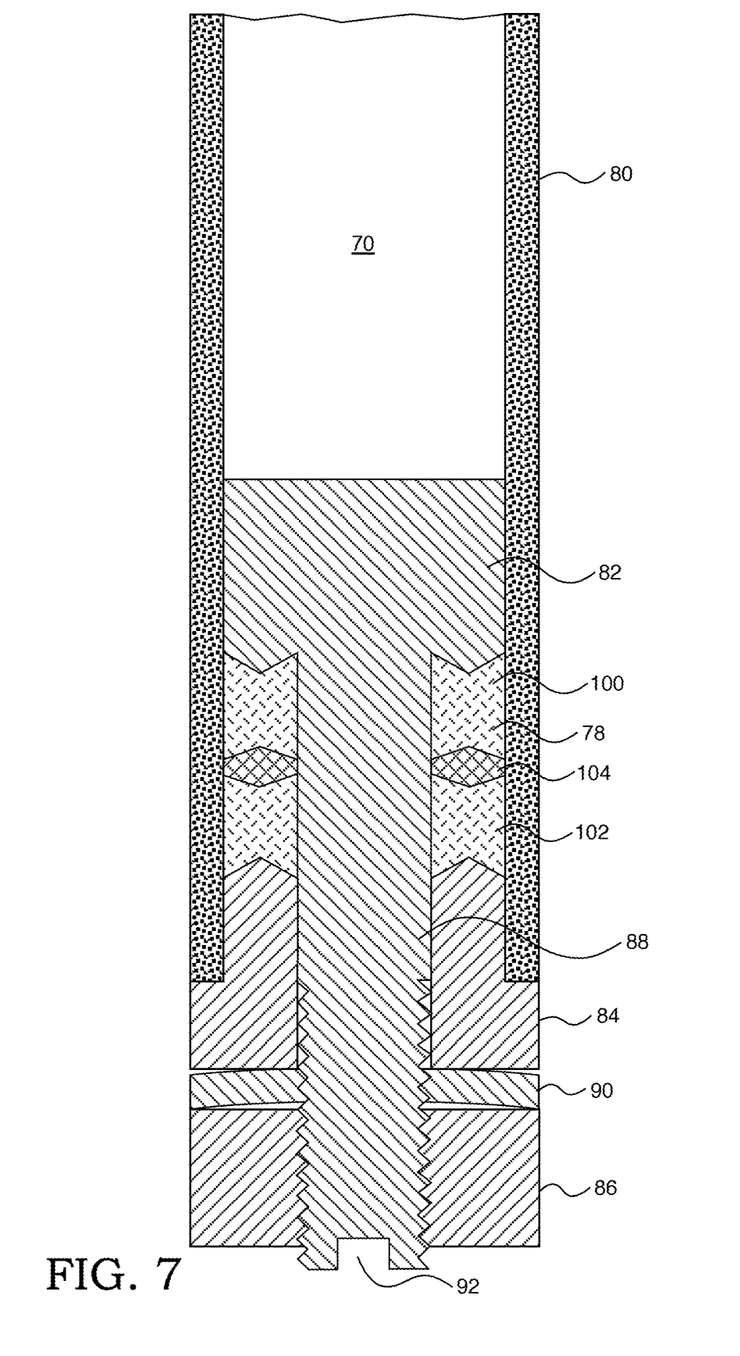
FIG. 7 is a schematic representation of a cross section of a fourth embodiment of this invention.

More than one sealing segment can be used as well as more than one sealing ring. This is shown in FIG. 7, where two different packing segments (100, 102) are connected by a packing spacer (104). Note that in this embodiment of the invention, the seat (84), the ram (82), and the spacer (104) have all been shaped to transmit more of the pressure from sealant compression toward the sealing surfaces along the tube (80) and the ram stem (88). Such shaping can be employed whether or not multiple flexible sealants are used. Note that in this embodiment, the end of the tube does not contact the seat, so that system pressurization can more effectively apply sealing pressure to the flexible sealant.

Accordingly, this invention provides a nuclear fuel rod cladding (80) formed from a material such as a ceramic that cannot be welded with a flexible gland seal closure. Preferably, the gland sealant (78) is formed from a material such as pure graphite. A screw ram (82) and a wedge-shaped seat (84) are used to compact and radially expand the sealant (78) and the seat (84), ram (82), and nut (86) are preferably composed of high temperature metallic materials such as Zircaloy 4. In an alternated embodiment of the device all components, except the graphite sealant, are composed of tough ceramic materials such as silicon carbide or partially stabilized zirconium oxide. A spring washer (90) or stack of spring washers are used to maintain compressive force on the sealant to compensate for sealant shrinkage or ram thermal or radiation induced expansion. In another alternate embodiment of the device, resilient metal sealing O-rings (94) provide a secondary seal and also apply force to the sealant to compensate for sealant shrinkage or ram thermal or radiation induced expansion. Multiple sets of sealing rings may be used. The resilient metal seal rings may be O, C, V, U or W shaped and the rings may be coated with a soft metallic material such as nickel or platinum so the soft metal and the resilient base metal do not corrode or otherwise degrade below 1200° F. (649° C.) in a primary water or steam environment. In still another embodiment, the ram (82) has a sealable passage through which helium can be added to the rod and the seal pressure tested. Where seal rings are employed, the end of the fuel rod inside diameter being sealed is machined to a flatness and ovality such that sealing rings will function. The ram and seat are shaped to optimally transmit compressive forces in a radial direction to the sealing surfaces. Multiple sealing rings and/or flexible sealants may be used.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. A nuclear fuel rod comprising:
   a tubular cladding constructed from silicon carbide and having interior walls surrounding an interior volume;
   a first closure sealing off one end of the tubular cladding;
   a nuclear fuel occupying a portion of the interior volume; and
   a gland seal end plug sealing off a second end of the tubular cladding;
   the gland seal end plug comprising:
      a flexible material made of graphite;
      an end stopper having an exterior end and an interior end and defining a passage therethrough, the exterior end of the end stopper having a seat that abuts and substantially closes off the second end of the tubular cladding, the interior end of the end stopper having at least one wedge-shaped surface;
      a ram having a stem that extends through the passage in the end stopper into an interior of the tubular cladding, and an interior end positioned between and in contact with the interior walls of the tubular cladding;
      the flexible material being positioned between and in contact with each of the interior walls of the tubular cladding, the wedge-shaped surface of the end stopper and the interior end and a portion of the stem of the ram, wherein the ram and the end stopper are configured to support and together exert pressure on the flexible material to radially outwardly expand the flexible material against the interior wall of the tubular cladding and seal off the second end of the tubular cladding; and
   a spring washer configured to be compressed along with the flexible material and to maintain a force on the flexible material even if there is thermal expansion of the ram or relaxation of the flexible material.

2. The nuclear fuel rod of claim 1 wherein the stem has a threaded exterior, and the gland seal end plug further comprises a nut coupled to a portion of the threaded stem and configured to draw the stem through the end stopper to pressure the flexible material against the wall of the interior of the tubular cladding.

3. The nuclear fuel rod of claim 2 wherein one or more of the seat, ram and nut comprises silicon carbide.

4. The nuclear fuel rod of claim 2 wherein the end stopper is coated with silicon carbide.

5. The nuclear rod of claim 1 wherein the spring washer comprises a partially stabilized Zirconium Oxide.

6. The nuclear fuel rod of claim 1 wherein the spring washer comprises a stack of spring washers.

7. The nuclear fuel rod of claim 1 wherein the end stopper is configured to prevent the flexible material from expanding through an interface between the interior of the tubular cladding and the end stopper.

8. The nuclear fuel rod of claim 1 wherein the flexible material consists of pure graphite.

9. The nuclear fuel rod of claim 1 wherein the flexible material comprises a mixture of graphite fiber and expanded graphite.

10. The nuclear fuel rod of claim 1 wherein one or both of the end stopper and the ram comprises Zirealoy 4.

11. The nuclear fuel rod of claim 1 wherein the seat is constructed in two layers including a gasket between the two layers of the seat that form a seal between the seat and the stem and the seat and the wall of the tubular cladding.

12. The nuclear fuel rod of claim 11, wherein the gasket comprises a plurality of O-ring gaskets.

* * * * *